(12) United States Patent
Baker

(10) Patent No.: US 9,002,961 B1
(45) Date of Patent: Apr. 7, 2015

(54) SYSTEM AND METHOD FOR SOCIALLY CONNECTING INDIVIDUALS BASED ON PSYCHOMETRICS, ZODIAC, AND ASTROLOGY

(71) Applicant: Jessica Baker, Houston, TX (US)

(72) Inventor: Jessica Baker, Houston, TX (US)

(*) Notice: Subject to any disclaimer, the term of this patent is extended or adjusted under 35 U.S.C. 154(b) by 235 days.

(21) Appl. No.: 13/712,416

(22) Filed: Dec. 12, 2012

(51) Int. Cl.
*G06F 15/16* (2006.01)
*H04L 12/58* (2006.01)

(52) U.S. Cl.
CPC .................................. *H04L 51/046* (2013.01)

(58) Field of Classification Search
None
See application file for complete search history.

(56) References Cited

U.S. PATENT DOCUMENTS

| | | | |
|---|---|---|---|
| 6,735,568 B1 | 5/2004 | Buckwalter et al. | |
| 7,337,172 B2* | 2/2008 | Shapiro | 1/1 |
| 2002/0091770 A1* | 7/2002 | Takakura et al. | 709/205 |
| 2002/0160339 A1 | 10/2002 | King et al. | |
| 2004/0210661 A1* | 10/2004 | Thompson | 709/228 |
| 2008/0155018 A1* | 6/2008 | Fortier et al. | 709/204 |
| 2008/0155030 A1* | 6/2008 | Fortier et al. | 709/206 |
| 2008/0155031 A1* | 6/2008 | Fortier et al. | 709/206 |
| 2010/0077032 A1 | 3/2010 | Drennan et al. | |
| 2013/0166661 A1* | 6/2013 | Robertson et al. | 709/206 |
| 2013/0191483 A1* | 7/2013 | Jhanji | 709/206 |
| 2014/0136610 A1* | 5/2014 | Lin et al. | 709/203 |
| 2015/0006659 A1* | 1/2015 | Cai et al. | 709/206 |

OTHER PUBLICATIONS

The Myers & Briggs Foundation, MBTI Basics, Web page, accessed: Feb. 7, 2011.
Type Tango, Myers Briggs Personality Type, Web page, accessed: Feb. 7, 2011.

* cited by examiner

*Primary Examiner* — Brian P Whipple
(74) *Attorney, Agent, or Firm* — Michael J. Feigin, Esq.; Feigin & Associates, LLC (57) ABSTRACT

The presently disclosed technology is directed towards a method of opening communication channels between a first and second person based on suggestions to the people related to MBTI, Chinese zodiac, and western astrology. Suggesting a match, in embodiments of the disclosed technology, is based on matches of all three categories or matches which are weighting two of three of the categories higher than the third.

20 Claims, 6 Drawing Sheets

| TYPE | MATCH 1 | Match 2 | CAREER PATHS |
|---|---|---|---|
| ISTJ | ESFP | ESTP | Business Executives, Administrators and Managers<br>Accountants and Financial Officers<br>Police and Detectives<br>Judges<br>Lawyers<br>Medical Doctors / Dentists<br>Computer Programmers, Systems Analysts, and Computer Specialists<br>Military Leaders |
| ESTJ | ISTP | INTP | Military leaders<br>Business Administrators and Managers<br>Police / Detective work<br>Judges<br>Financial Officers<br>Teachers<br>Sales Representatives |
| ISFJ | ESTP | ESFP | Interior Decorators<br>Designers<br>Nurses<br>Administrators and Managers<br>Administrative Assistants<br>Child Care / Early Childhood Development<br>Social Work / Counselors<br>Paralegals<br>Clergy / Religious Workers<br>Office Managers<br>Shopkeepers<br>Bookkeepers<br>Home Economics |
| ESFJ | ISFP | INFP | Home Economics<br>Nursing<br>Teaching<br>Administrators<br>Child Care<br>Family Practice Physician<br>Clergy or other religious work<br>Office Managers<br>Counselors / Social Work<br>Bookkeeping / Accounting<br>Administrative Assistants |
| ISTP | ESTJ | ENTJ | Police and Detective Work<br>Forensic Pathologists<br>Computer Programmers, System Analysts and Computer Specialists<br>Engineers<br>Carpenters<br>Mechanics<br>Pilots, Drivers, Motorcyclists<br>Athletes<br>Entrepreneurs |

SYSTEM AND METHOD FOR SOCIALLY CONNECTING INDIVIDUALS BASED ON PSYCHOMETRICS, ZODIAC, AND ASTROLOGY

FIELD OF THE DISCLOSED TECHNOLOGY

This application relates generally to on-line social interactions and, more specifically, matching individuals based on psychometrics, Chinese zodiac, and western astrological signs.

BACKGROUND OF THE DISCLOSED TECHNOLOGY

Online meeting is a method which permits individuals to get in touch, interact, and communicate with each other over the Internet, usually with the goal of developing a career networking, personal networking for friends, or romantic relationship. As a result, this system of matchmaking is carried out through the use of computers or cell phones with internet access. Such online meeting services or sites usually require users to create a profile that includes information such as age, physical attributes, profession, and location. Also, the profile may include information as to the ideal partner matches that such user is looking for, dependent on what type(s) of relationships they are looking to develop.

Many online meeting sites are focused on matching individuals from diverse backgrounds, or on the basis of religion or profession. One of these prior art references is U.S Patent Publication Application 2010/0077032 to Drennan et. al that uses Myers-Briggs Type Indicator (hereinafter MBTI) to match individuals. The MBTI is a system utilizing a questionnaire to categorize individuals into different personality types.

Still further, U.S Patent Application Publication 2002/0160339 to King et. al., discloses another system of matching individuals by calculating a weighted average of an individual's compatibility under the Chinese and Western astrological signs. The system has tables of combined compatibility and calculates the weighted average between the Chinese and Western astrological signs compatibility.

Further, U.S. Pat. No. 6,735,568 to Buckwalter et. al., assigned to EHarmony.com, discloses a matchmaking system that provides communication between individuals or users whose survey data, combined with other questions suggests that such individuals are likely to succeed in a relationship with each other. Such a system polls users and allows users to present questions to other potential individuals who are interested in developing a relationship with that user.

However, these disparate systems of matching people are limited to a single type of matching, and are, further, limited to dating.

SUMMARY OF THE DISCLOSED TECHNOLOGY

An object of the disclosed technology is to socially connect and match individuals based on psychometrics, zodiac, and astrology In an embodiment of the disclosed technology, a method of opening communications channels between a first and a second person is a carried out. A date of birth is received from the first and the second person. Then, the first and the second person are polled, with answers received from each of the first and the second persons. Further, a MBTI is determined for the first and the second person based on the given answers. Still further, a Chinese zodiac sign corresponding to the first and the second person is determined based on the received date of birth. Further, a western astrology sign corresponding to the first and the second person is determined based on the received date of birth.

Further, at least one attribute characteristic of the first and the second person is determined, and at least one limiting attribute required of a matching person from the first and the second person, in an embodiment of the disclosed technology. The first person then receives information about the second person if a weighted ranking of the MBTI, the Chinese zodiac, and the western astrology are determined to be above a compatibility threshold, and the second person has the limiting attributes required of the first person. A communication channel between the first and the second person is set up, based on an expressed desire to communicate from the first person to the second person and that matching is then opened.

In the above embodiment of the disclosed technology, a limiting attribute may be a combination of age and sex. Further, another limiting attribute may be the geographical distance between the first and the second party. Still further, having a limiting attribute may consist of a limitation regarding personality type selected by the first or the second party.

In the above embodiment of the disclosed technology, a characteristic attribute may be an interest, by each individual, in a particular relationship type, where the relationship type may be a romantic partnership or a friendship. Further, in the above embodiment of the disclosed technology, a characteristic attribute may be an interest, by each individual, in a particular relationship type, where the relationship type may be a business relationship.

Further, suggesting a match for the parties may be carried out by taking a weighted average of compatibility of the Chinese zodiac and the western astrology, and either the Chinese zodiac or the western astrology is given more weight based on the greater amount of communication from the first party in prior provided matches, where the first zodiac type matched and the second zodiac type failed to match. Still further, a match may be suggested when any two of the MBTI, the Chinese zodiac, and the western astrology may match completely, and the third matches based on a single data point of matching with other data points of the third item being incompatible. Further, in the above embodiment of the disclosed technology, a weighted average of compatibility between the western astrology and the Chinese zodiac is low compared to a predefined threshold, or absent, then a match may be suggested based on the western astrology.

Further, in the above embodiment of the disclosed technology, when individuals who are of the same type of MBTI and a weighted average of compatibility between the western astrology and the Chinese zodiac is low compared to a predefined threshold, then a match may be suggested based on the MBTI compatibility rating. Still further, a zodiac matching may be discarded only when the Myers-Briggs and other zodiac type match perfectly or near-perfectly, where near-perfect is having, at most, one element or data point fail to match.

Further, in the above embodiment, a starting point of weighting of the zodiac and the MBTI may be changed for future searches for matches of individuals based on providing at least one match based on each possible combination of two matching criteria selected from the group consisting of the MBTI, the western astrology, and the Chinese zodiac. Further, the starting point of the weighting of the zodiac may be changed based on recording the number of the express desires to communicate for each of the possible combination. Still further, the starting point of the weighting of the zodiac may be changed based on recording the length of the communication between the individuals using the communication channel for each of the possible combinations. Further, the starting point of the weighting of the zodiac may be changed based on ranking the combination of matches based on the number of the express desires to communicate or the length of communication. Further, the starting point of the weighting of the zodiac may be changed based on weighting the combinations having a higher ranking in the future searches. A person may also search any of MBTI, Chinese zodiac, western astrology, or even personal preferences alone, regardless of their own MBTI, zodiac, or astrology.

In another embodiment of the disclosed technology, there is a system of opening a communications channel between two individuals. The system has means for receiving a date of birth for each individual of the two individuals. Further, the system in the above embodiment, polls each individual with questions, and receives answers to the questions from each individual that was polled. The system determines the MBTI four letter type for each individual based on the answers of each individual. Further, the system determines each individual's Chinese zodiac, based on the received data of birth of each individual. Still further, the system determines each individual's western astrology, based on the received date of birth of each individual.

Further, the system in the above embodiment of the disclosed technology has means for receiving attributes characteristic of each individual, and required attributes of another individual. Still further, the system suggests at least one match to a user based on the attributes characteristic of each individual, required attributes of another individual, compatibility according to the determined MBTI for each individual, and compatibility according to the Chinese zodiac and western astrology. Further, the system receives an indication by one individual of accepting at least one match, and opens a communication channel between the one individual and another individual associated with the accepted match.

In another embodiment of the disclosed technology, a device is configured to open a communications channel between two individuals based on criteria about the individuals. The device has an input and output user interface, a memory, a storage device, a network node receiving a date of birth for each individual of the two individuals and sending each individual questions, as well as receiving answers to the questions from each individual. Further, the device in an embodiment of the disclosed technology has a processor, configured to carry out instructions to determine an MBTI four letter result type for each individual based on the answers, and determine each individual's Chinese zodiac, based on the received date of birth, and further determine the western astrology for each individual, based on the received date of birth.

Still further, the device in the above embodiment of the disclosed technology has a network node which further receives attributes characteristic of each individual and the required attributes of another individual. Further, the processor carries out instructions to determine compatibility according to the determined MBTI for each individual and compatibility according to the Chinese and the western zodiac. Still further, the device in an embodiment of the disclosed technology receives an indication by one individual of accepting a match, and opens a communication channel between the individual and another individual associated with the match.

Further, in the above embodiment, characteristic attributes of the individuals may be a combination of age and sex. Still further, a characteristic attribute of the individuals may be a geographical distance from the individual. Further, the characteristic attribute of the device in an embodiment of the disclosed technology may be an interest of each individual in a particular relationship type, where the relationship type may be a romantic partnership or a friendship.

In the above embodiment, the device may have a characteristic attribute that may be an interest of each individual in a particular relationship type, where the relationship type may be a business relationship. Further, the device may suggest a match for individuals based on a weighted average of compatibility of the Chinese zodiac and the western astrology.

Still further, in the above embodiment, a match may be suggested when the MBTI is weighted against the Chinese zodiac and the western astrology, and where the device suggests the highest compatibility rating of the two combinations. Further, the device may suggest a match based on the western astrology when a weighted average of compatibility between a western astrology and Chinese zodiac is low, compared to a predefined threshold, or absent. Further, in an embodiment of the disclosed technology, the device may suggest a match based on MBTI, when individuals are of the same type of MBTI, and a weighted average of compatibility between the western astrology and the Chinese zodiac is low compared to a predefined threshold. Each item used for weighted may also be chosen or unchosen by a user, giving them the ability to search based on all three, two, or only one factor.

DETAILED DESCRIPTION OF EMBODIMENTS OF THE DISCLOSED TECHNOLOGY

The presently disclosed technology is directed towards a method and system of socially connecting individuals based on psychometrics, the Chinese zodiac, and Western astrology. The presently disclosed technology involves a method of opening a communications channel between a first and a second person, carried out, for example, by way of the following steps. First, dates of birth are received from a first and a second person. The first and second persons are then polled, via a questionnaire sent to each person, with answers received back there-from. Based on the answers, one or each of the following is determined for each person: an MBTI, a Chinese zodiac sign, and a Western astrology sign corresponding to each first and second person. These data are determined based on the received dates of birth. Still further, at least one attribute characteristic of each of the first and the second persons may be received, as well as a limiting attribute required of a person from a person, to limit matches of a second person which are provided. (The 'limit criteria' or 'limiting attribute' is defined below.)

Based on the criteria, information about the second person is displayed or exhibited to the first person, based on the first person's attributes and limitation criteria, if the MBTI, the Chinese zodiac, and the Western astrology are determined to be compatible. Further, there is a step of providing a communication channel between the first and second person, based on an expressed desire to communicate between the parties.

Embodiments of the disclosed technology will become clearer in view of the following description of the figures.

Figure 1:
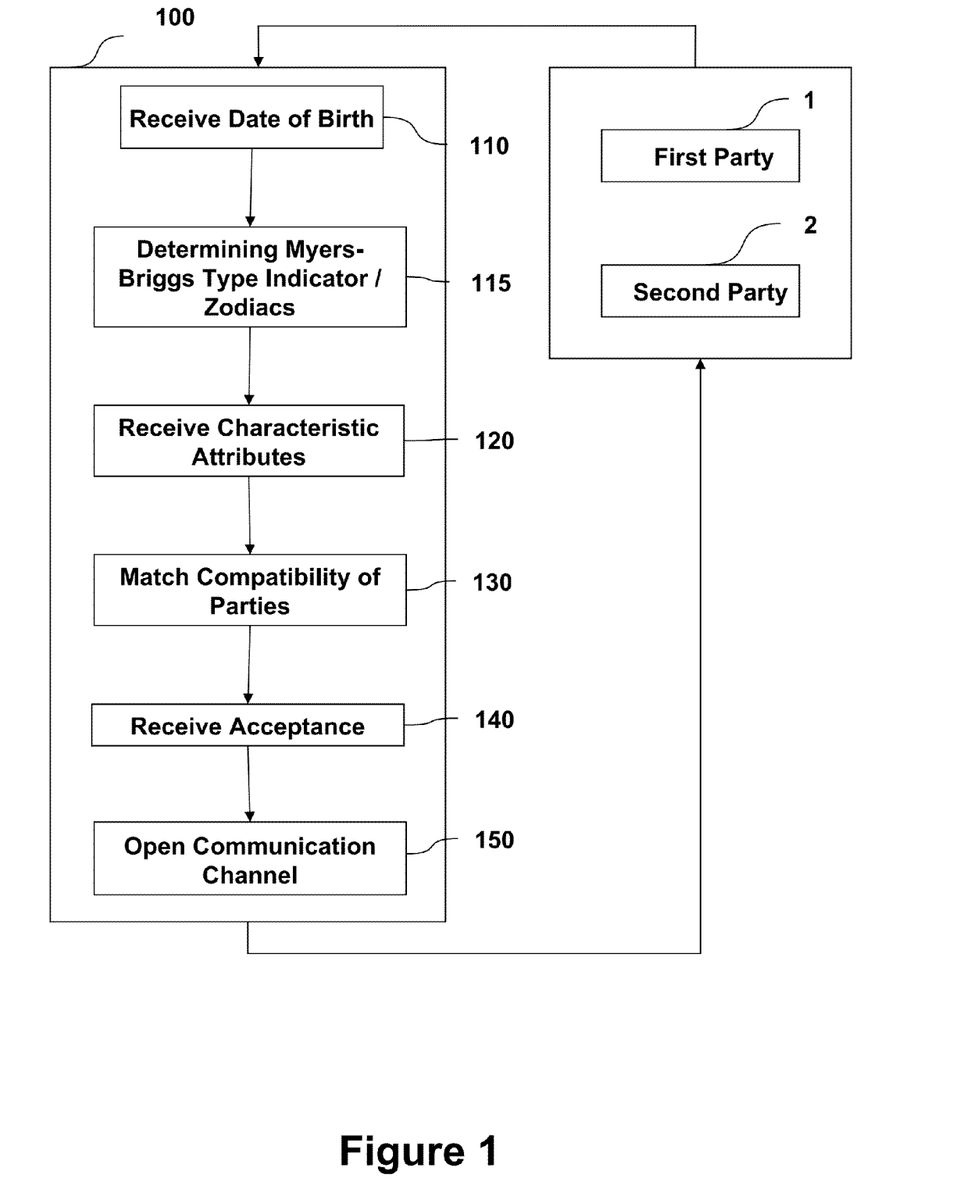
FIG. 1 shows a high level diagram of steps carried out by a social interaction service provider to match and open a communication channel for individuals in embodiments of the disclosed technology.

FIG. 1 shows a high level diagram of steps carried out by a social interaction service provider to match and open a communication channel for individuals in embodiments of the disclosed technology. The figure shows a first party 1 and second party 2 entering data into system 100 in order to seek and get in touch with other compatible individuals. It should be noted that individuals 1 and 2 were chosen for example purposes, and there could be a number of individuals using said system 100 at the same time or at different times seeking other potential compatible individuals based on zodiac signs, MBTI, and other attributes.

Referring now to the steps carried out by the system 100, upon receiving a date of birth 110 for each individual (or any individual). In step 115, the system 100 (such as a processor adapted to carry out instructions) calculates the Chinese zodiac sign and western astrology sign for the individuals 1 and 2, as well as a Myers-Briggs type, based on received information from the individual. Western zodiac is defined as a circle of twelve 30° divisions of celestial longitude that are centered upon the ecliptic, the apparent path of the sun across the celestial sphere over the course of the year, each corresponding to a pre-designated symbol or sign and associated with a specific character trait or set of traits. The western zodiac is part of western astrology. The Chinese zodiac is based on a yearly cycle, each year assigned to an animal, whereby a person born in that year is said to have certain character traits. MBTI, also referred to as the Myers-Briggs system or the like in this disclosure, is an assessment based on a psychometric questionnaire designed to measure psychological preferences in how people perceive the world and make decisions. These preferences were extrapolated from the typological theories proposed by Carl Gustav Jung and first published in his 1921 book *Psychological Types* (English edition, 1923).

Referring still to FIG. 1, a step of receiving one characteristic attribute 120 is shown. A "characteristic attribute" is defined as a characteristic that is required by an individual in order for a match to occur which may include age, marital status, sex, race, religion, geographic distance from oneself or from a specific location, closeness of match in a zodiac system, astrological system, or compatibility of a personality type, specific personality type, astrology, or zodiac, or a combination thereof.

Once the information is received from each of at least two users, including Myers-Briggs Type (based on a sent and a completed, received questionnaire), western astrology (based on birth date), Chinese zodiac (based on birth date), and limiting characteristic attributes of a party in results to be returned, step 130 is carried out. In this step, the compatibility of the parties is matched for at least some of the prior-described functions of personality type, zodiac, astrology, and criteria entered by the party, such as the second party, looking for compatible partners. It should be understood that a compatible partner may be a romantic partner, a friend, a business partner/relationship, or otherwise. Weighted average calculations and/or compatibility tables may be used to limit the matches, or rank the matches.

Referring again to FIG. 1, in step 140, an acceptance is received whereby a party (1 or 2) indicates that he/she would like to contact another party who meets his/her match requirements, based on a result or results of step 130. Once the system 100 receives the acceptance, then it performs another step of opening a communication channel 150 (such as e-mail, text message, instant message, voice, data, or otherwise) for said parties to communicate by way of the system 100, in a circumscribed manner (a manner controlled by the system 100 which allows either party to reject further communications through the system 100, and in a manner that provides certain information to the party being communicated to, such as which data matched between the two parties). In this manner, parties 1 and 2 communicate with each other in a safe environment, controlled by the system 100 and based on matching criteria, including one or more of zodiac, astrology, and personality type.

Figure 2:
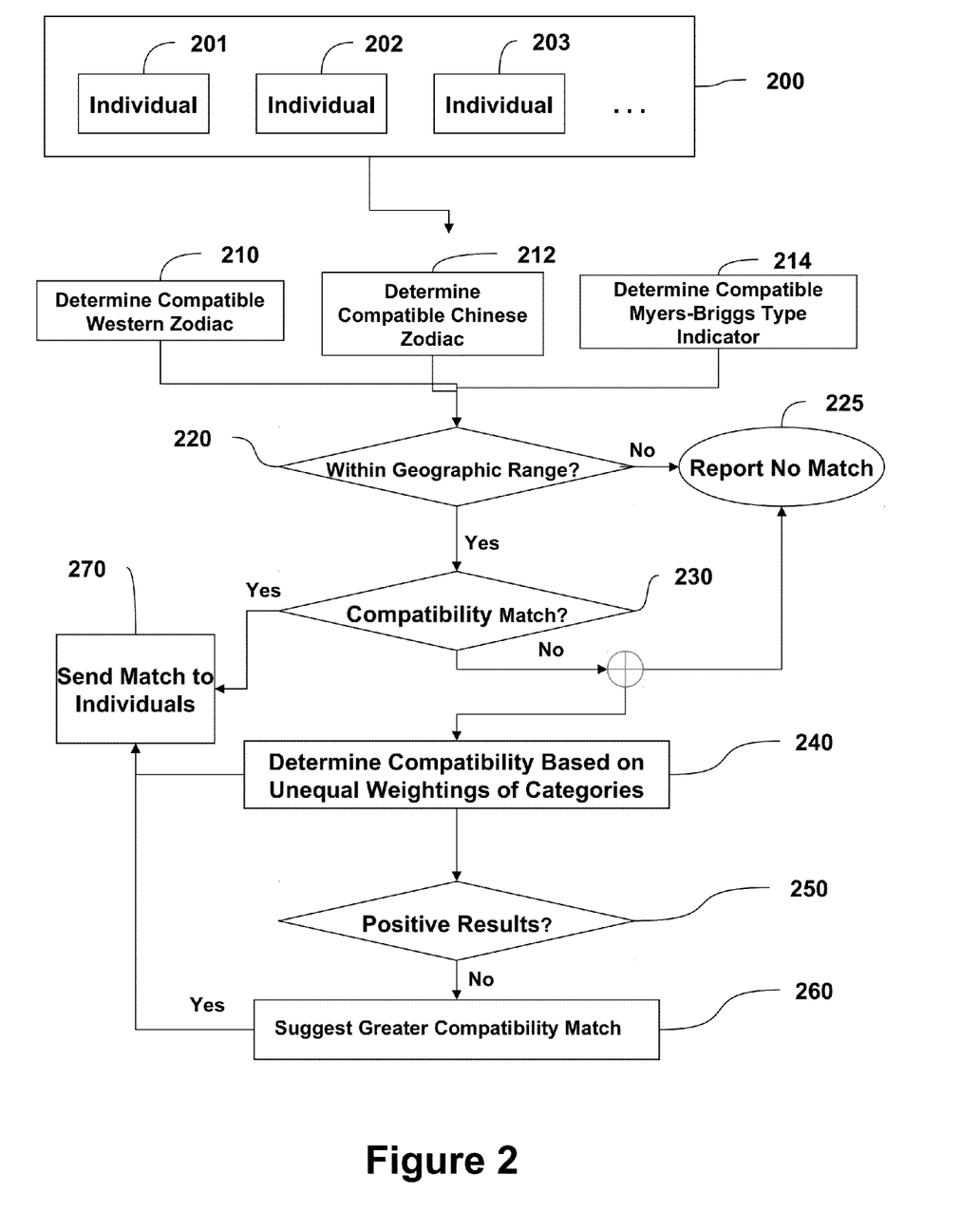
FIG. 2 shows steps carried out to suggest a match to individuals in embodiments of the disclosed technology.
Figure 3:
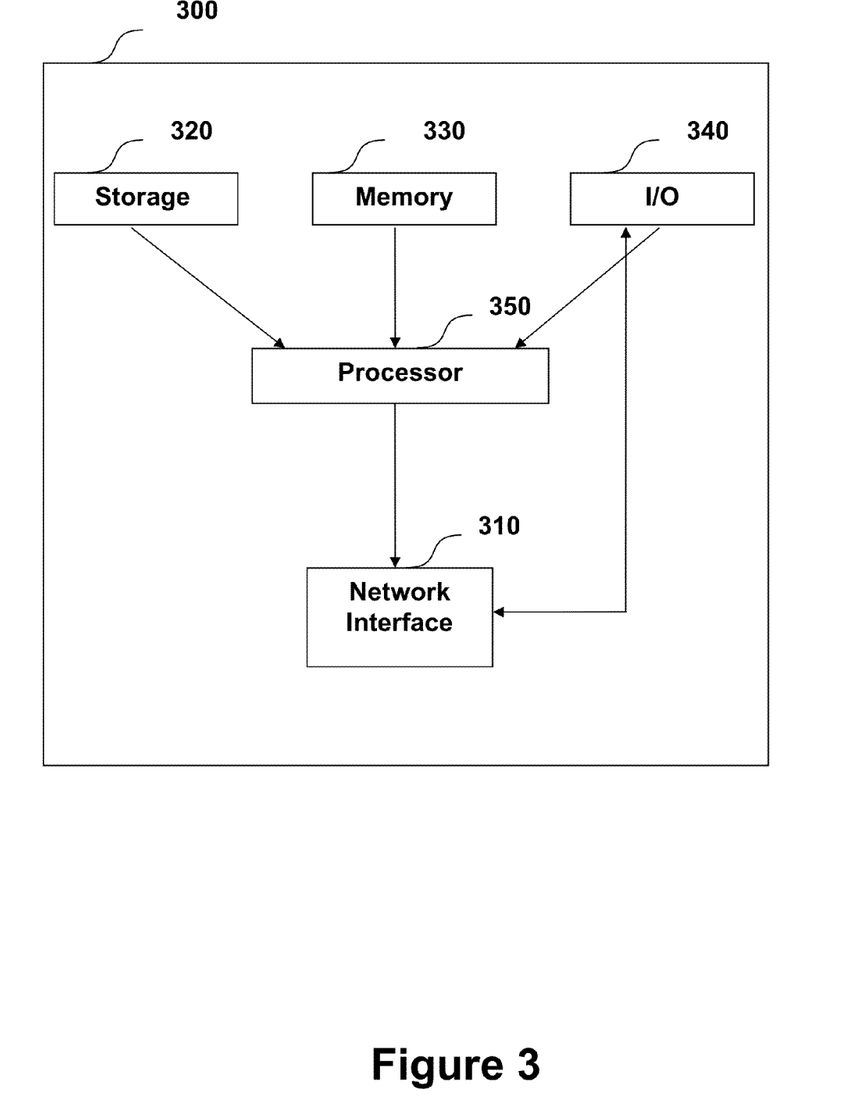
FIG. 3 shows a high-level block diagram of a device on which aspects of the disclosed technology may be carried out, in an embodiment of the disclosed technology.

FIG. 2 shows steps carried out to suggest a match to individuals in embodiments of the disclosed technology. These steps may be carried out by a "social interaction service provider" which is a device (such as a high level computer system as shown in FIG. 3), a person, an organization, or otherwise, that receives information and matches people based on certain criteria, based on, or taking into consideration at least and/or including, location, zodiac, astrology, and personality type. Individuals 200, which may include any number of people, such as individuals 201, 202, and 203, enter their birth date and take personality assessments(s), such as Myers-Briggs assessments, as shown in FIG. 1. Using this information, Chinese zodiac (step 212), western astrology (step 210), and/or MBTI (step 214) are determined for each user of such a system.

In step 220, it is determined if there are matches, based on any or all of the determinations in steps 210, 212, and 214, which are within a certain geographic range, either designated by the system (such as system 100) or by the user of the system, such as individual 201. Alternatively, a user may select which factors they want to search by, regardless of their own attributes. If there are no matches within range, then step 225 is carried out and the method or process stops, with an indication that "no matches are found" or any other such notice to a user seeking matches. However, if there are others which are within the geographic range (step 220) and match one, two, or three of the criteria of steps 210, 212, and 214, then in step 230, such matches are determined and step 270 is carried out where the matches are sent to the individuals. Once a match is sent, a communication channel may also be opened, such as described with reference to FIG. 1. If no matches are found in step 230, then step 225 may be carried out (the process of finding matches ends), or in the alternative, the method proceeds to step 240, as described below.

Referring still to FIG. 2, in step 240, weighted averages of two out of three categories of zodiac, astrology, and psychometric criteria are determined. This is done, for example, when matches based on all three categories are not found (in step 230), or, in addition to such matches to provide further results of potential matches, based on two categories. Such matches may be provided automatically when carrying out the steps shown in FIG. 2, or only if the user seeking matches indicates a desire to see more matches based on unequal weightings of categories. For example, a preset unequal weighting to be used in step 240, or one selected by a user, is based on MBTI alone, or along with one of the zodiac types. Further, within MBTI are four data points. If all four data points (e.g., ESTJ) match with another (e.g., ISTP), then Myers-Briggs may be weighted higher and may be considered enough to suggest a match between individuals in the box 200. Further, another match could be obtained if there is a match between individuals preferring the western astrology category. Still further, step 240 may suggest a match just based on the Chinese zodiac category, if that is a category of preference of individuals in the box 200.

It should be further understood that each of the categories used to match individuals 200 (Chinese zodiac, and western astrology) does not necessarily represent "black and white" matching criteria. As stated above, these categories may be matched based on up to four data points, and may include matching based on one, two, or three data points. Similarly, in Chinese zodiac and western astrology, some zodiac signs are considered to be extremely compatible, while others are considered to be compatible, though less so. Depending on user preference for one matching criterion or another, and amount of compatibility within a criterion for two individuals, a match is given greater or lesser weight, and a criterion (category) is further given a greater or lesser weight, in embodiments of the disclosed technology. The closer the match within a criterion (e.g., western astrology), the higher weight this criterion is given. Upon a person indicating preference for another individual or communicating above a pre-defined threshold with an individual who matches strongly due to one criterion or another, future searches yield higher ranked suggestions based on the previously positive results of connections of such individuals. For example, where conversations/communications between an individual 201 and other individuals is greatest when western astrology matches best, despite what other criteria say, then future suggestions for individual 201 give more weighting or importance to western zodiac for this person.

Further, If the weighted average of two of the categories is greater than the third category, then such compatibility matches are determined and considered to be positive results 250, whereafter step 270 is carried out. Yet, if there are no compatibility matches and no positive results 250, then step 270 of sending matches to individuals is not carried out. But, a further step of suggesting a greater compatibility match 260 is carried out which, after determining a greater compatibility match, enables step 270 to be carried out and to send the matches to individuals 200. Step 270, in addition to the suggested match, may send contact information to each individual in order to open communication channels between individuals in the box 200. Such contact information may include profile name, picture, and other relevant information.

Thus, as a starting point of weighting of the zodiac, astrology, and Myers-Briggs for searches, the weighting of each of these criteria may be adjusted based on past results. So, if in the past, at least one match based on each possible combination of two matching criteria is made, then the number of successful matches is determined based on the number of express desires on the part of one individual to communicate with another, the number of acceptances by the other party, the amount of communication they have (measured as length in terms of time from first to last communication or length of written or spoken communication to each other), and so forth. Thus, the quality of the communication and matches can be ranked and future matches in the system as a whole, or for each individual, can be tweaked based on past results of communication quality for each combination of matching criteria.

FIG. 3 shows a high-level block diagram of a device 300 on which aspects of the disclosed technology may be carried out. FIG. 3 shows a high-level block diagram of a device that may be used to carry out the disclosed technology. Device 300 has a processor 350 that controls the overall operation of the computer by executing the device's program instructions which define such operation. The device's program instructions may be stored in a storage device 320 (e.g., magnetic disk, database) and loaded into memory 330 when execution of the console's program instructions is desired. Thus, the device's operation will be defined by the device's program instructions stored in memory 330 and/or storage 320, and the console will be controlled by processor 350 executing the console's program instructions.

Referring still to FIG. 3, the device 300 also includes one or a plurality of input network interfaces for communicating with other devices via a network (e.g., the internet). The device 300 further has an electrical input interface for receiving electrical current. A device 300 also has one or more output network interfaces for communicating with other devices, such as routers, switches, hubs, and other network nodes. Device 300 also includes input/output representing devices which allow for user interaction with a computer (e.g., display, keyboard, mouse, speakers, buttons, etc.). One skilled in the art will recognize that an implementation of an actual device will contain other components as well, and that FIG. 3 is a high level representation of some of the components of such a device for illustrative purposes. It should also be understood by one skilled in the art that the method and devices depicted in FIGS. 1 through 2 may be implemented on a device such as is shown in FIG. 3.

Figure 4:
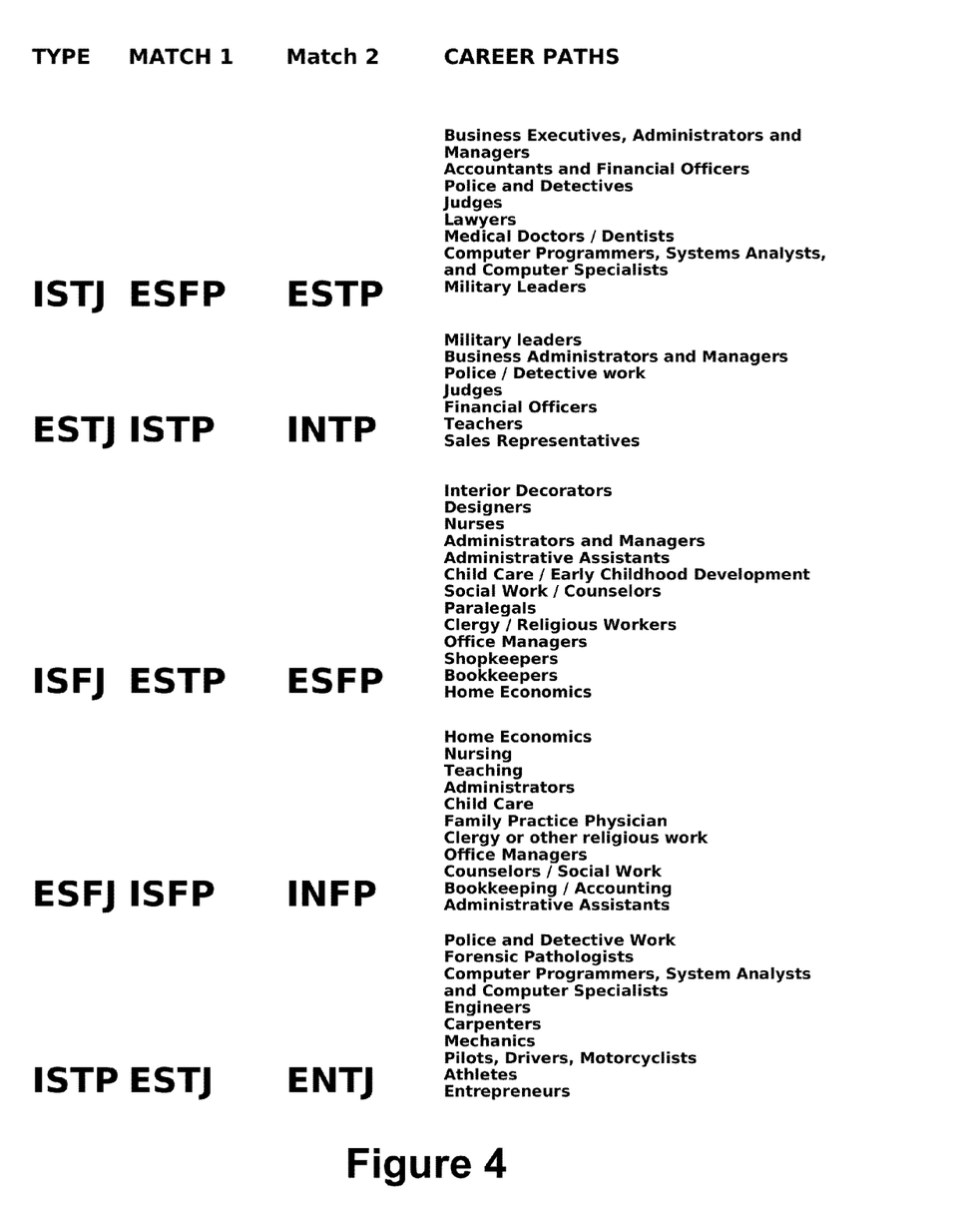
FIG. 4 shows a portion of a match-aligning grid used to determine matches based on the MBTI scale, in an embodiment of the disclosed technology.

FIG. 4 shows a portion of a match-aligning grid used to determine matches based on the MBTI scale, in an embodiment of the disclosed technology. The methods, described herein above, use data from this table, in embodiments of the disclosed technology, to determine matches for a given individual based on his/her personality type. For example, a person who is assessed on the scale as an introvert, sensing, thinking, judgment (ISTJ) type would be most compatible with a extravert, sensing, feeling, perception (ESFP) type, according to the table. Combined with astrological signs and zodiac, and weighted based on closeness of match, a rating of compatibility can be achieved. For example, with Myers-Briggs, there are four data points. If all four data points (e.g., ESTJ) match with another (e.g., ISTP), then Myers-Briggs may be weighted higher. On the other hand, it may be that three data points match (e.g., ESTJ with ISTJ). As such, this is not a complete match, but still has some matching characteristics, and thus, Myers-Briggs may be used, but receive a lower weighting, or lower the overall score/suggestion rank of such a match. Similarly, this may be done with zodiac matching—for example, the dog and the monkey of Chinese zodiac may not be completely compatible, but in a case where Myers-Briggs is completely compatible, then the weighting of the Chinese zodiac may be decreased or even discarded. In one embodiment, a zodiac matching is discarded only when the Myers-Briggs and other zodiac type match perfectly or near-perfectly (near-perfectly is defined as having one element or data point fail to match). In this manner, empirically, using lots of matching and seeing which people maintain communications through the open communication channels provided, it may be determined which method of matching is best and which data points are most important, thus allowing the system to be tweaked and better matches and weighting to be given in the future.

Figure 5:
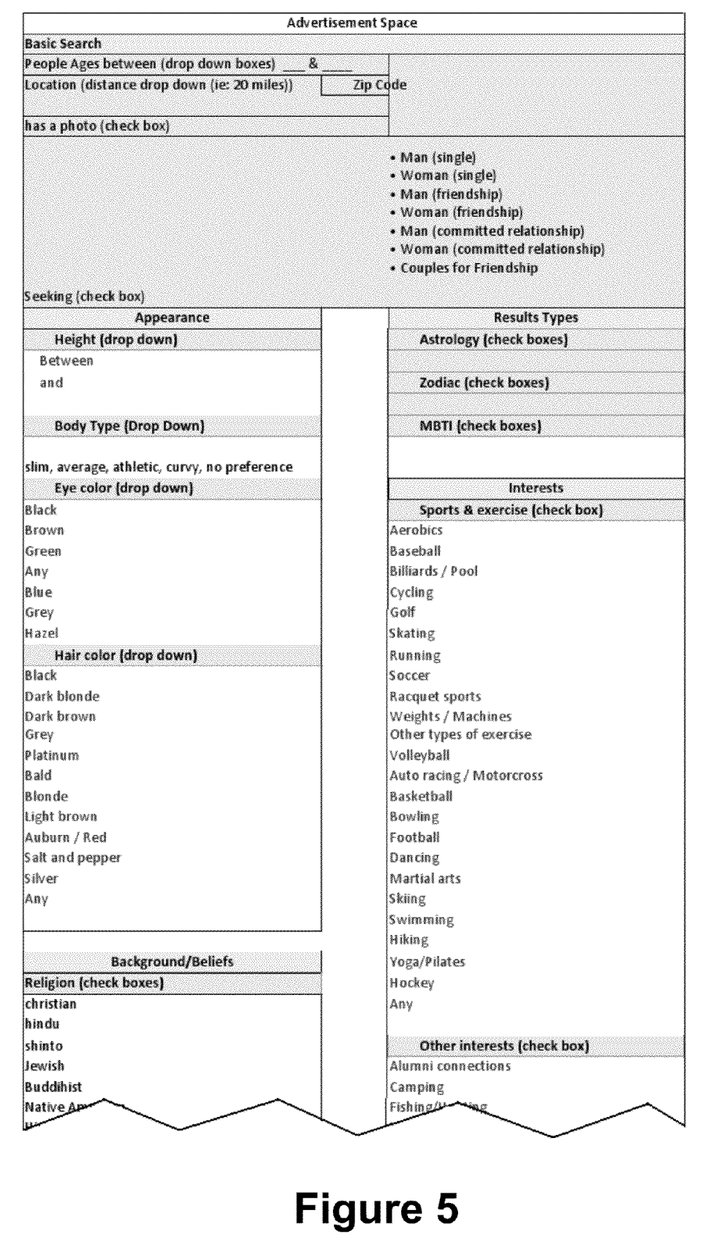
FIG. 5 shows an example of a screen shot of a customizable search query based on traits, in an embodiment of the disclosed technology.

FIG. 5 shows an example of a screen shot of a customizable search query based on traits, in an embodiment of the disclosed technology. As shown, zodiacs, along with other personal preferences, are amongst the bases that may be used to find other individuals. A search may be based on any trait, but in an embodiment of the disclosed technology the interface uses zodiac as the most heavily weighted factor in determining relevant matches. Depending on a user's preference, one of the selected three assessments may carry more weight in returning search results. For example, if a person believes the Chinese zodiac is a more accurate scale, that person can search solely on the basis of Chinese zodiac or by choosing to pay greater deference to matches.

Figure 6:
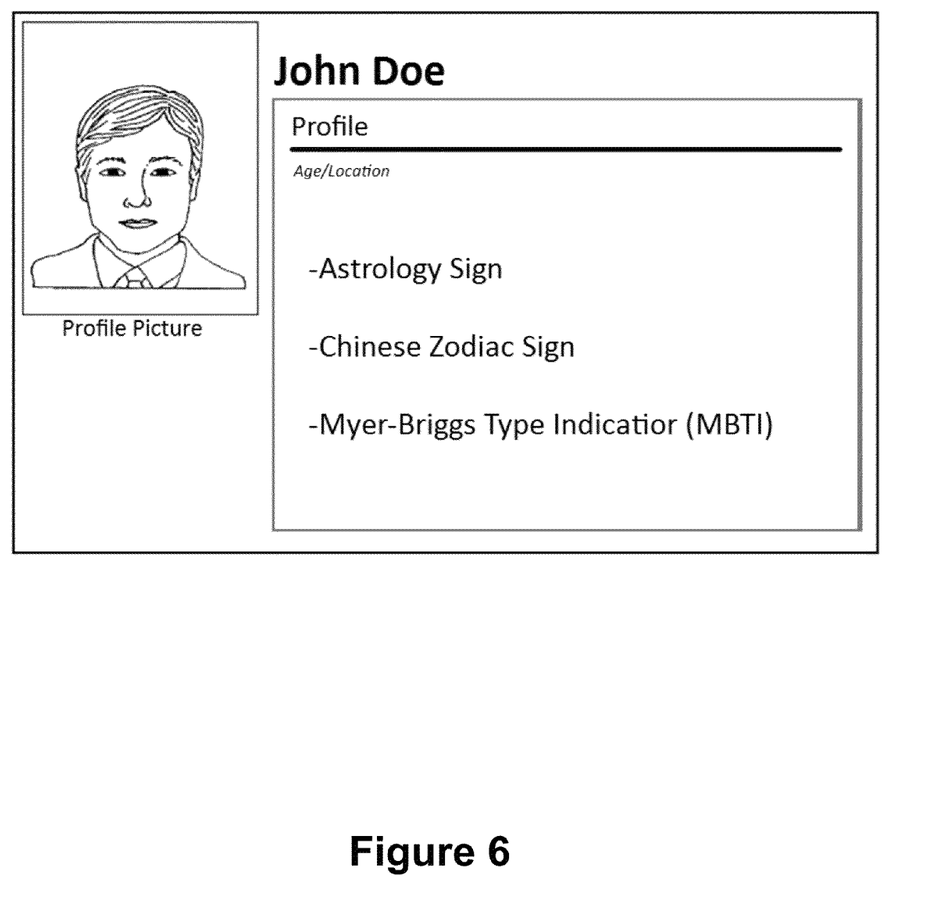
FIG. 6 shows an example of a user profile with relevant psychological, zodiacal, and astrological traits displayed in an embodiment of the disclosed technology.

FIG. 6 shows an example of a user profile with relevant psychological and zodiacal traits displayed in an embodiment of the disclosed technology. Such a user profile represents an individual. The individual may customize his or her profile using the interactive interface. A user profile will be created for a user once the user has registered with the interface by providing certain credentials.

Further, FIG. 6 shows a user profile which has a name of the individual and his or her profile picture. The user profile shows the three core personal assessments which form the basis of the disclosed system and method. These assessments are the MBTI, Chinese zodiac symbol, and western astrological symbol, and may or may not be disclosed to others, at the selection of the user. Other commonly used personality traits (not shown) may be displayed on the user profile as well. Such traits include, but are not limited to, age, sex, location, occupation, education, income, religion, ethnicity, interests, hobbies, marital status, familial status, height, weight, body type, hair color, eye color, political views, alcohol use, and smoking habits.

Searching functions of the user account may be divided into three categories which provide the user with the ability to execute a new search, edit different criteria that the searches are based on, and another category that shows a search history of all the saved searches that a user has executed in the past.

In addition, the user account may have a people result function which shows matches of the account user with other persons, mail sent or received by the account user, connections that the individual has had with others, and preferences of the individual related to compatibility matches which could be edited. Further, the user account shows information regarding the individual. For example, the user account may show the email of the account user, as well as the profile status which could be visible or not visible to the public. Further, a function of sharing an individual's zodiac, astrology, and MBTI results is shown in the user account.

A displayed profile of a user account may also have many functions. One function enables the user or individual to enter and display the gender and physical location of said account user. Another profile function shows the gender of a person that the account user is interested in seeking and the distance of the search that is acceptable to said account user. Another function shows a link of pictures of the account user and updated information about said individual. In addition, the symbols of the western astrology and Chinese zodiac results of the account may be shown under the profile section of the user account.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

I claim:

1. A method of opening a communications channel between a first and a second person, comprising the steps of:
   receiving a date of birth from said first and said second person;
   polling said first and said second person, and receiving answers for said first and said second person;
   determining a Myers-Briggs Type Indicator (MBTI) for said first and said second person based on said answers;
   determining a Chinese zodiac sign corresponding to said first and said second person, based on said received date of birth;
   determining a Western astrological sign corresponding to said first and said second person, based on said received date of birth;
   receiving at least one attribute characteristic of said first and said second person, and
   receiving at least one limiting attribute required of a person from said first and said second person;
   exhibiting to said first person, information about said second person if a weighted ranking of said MBTI, said Chinese zodiac, and said Western astrological sign are determined to be above a compatibility threshold, and said second person comprises said at least one limiting attributes required of said first person; and
   providing a communication channel between said first and said second person, based on an expressed desire to communicate from said first person to said second person.

2. The method of claim 1, wherein said at least one limiting attribute is a combination of age and location.

3. The method of claim 2, wherein said at least one limiting attribute further comprises a limitation by distance between said first and said second party.

4. The method of claim 3, wherein said at least one limiting attribute further comprises a limitation by personality type selected by said first or said second party.

5. The method of claim 1, wherein said at least one characteristic attributes further comprises an interest, by each said party, in a particular relationship type, wherein said relationship type is a romantic partnership or a friendship.

6. The method of claim 1, wherein said at least one characteristic attributes further comprises an interest, by each said individual, in a particular relationship type, wherein said relationship type is a business relationship.

7. The method of claim 1, wherein a match for parties is suggested based on a weighted average of compatibility of said Chinese zodiac and said western astrology and either said Chinese zodiac or said Western astrologic sign is given more weight based on a greater amount of communication from said first party in prior provided matches where a first zodiac type matched and a second zodiac type failed to match.

8. The method of claim 1, wherein a match is suggested when any two of said MBTI, said Chinese zodiac, and said Western astrologic sign match completely, and the third matches based on a single data point of matching with other data points of said third item being non-matched.

9. The method of claim 1, wherein, when a weighted average of compatibility between said Western astrologic sign and said Chinese zodiac is low compared to a predefined threshold or absence, then a match is suggested based on said western zodiac.

10. The method of claim 1, wherein individuals are of the same type according to said MBTI, and a weighted average of compatibility between a western astrology and Chinese zodiac is low compared to a predefined threshold, then a match is suggested based on said MBTI compatibility rating.

11. The method of claim 1, wherein a said zodiac matching zodiac, including said Chinese zodiac or said Western astrological sign, is discarded only when said Myers-Briggs and other zodiac type match perfectly or near-perfectly, wherein near-perfectly is having, at most, one element or data point fail to match.

12. The method of claim 1, wherein a starting point of weighting of said Chinese zodiac and/or said Western astrological sign and said Myers-Briggs is changed for future searches for matches of individuals based on:
 providing at least one match based on each possible combination of two matching criteria selected from the group consisting of said MBTI, said Western astrological sign and said Chinese zodiac;
 recording the number of said express desires to communicate for each said possible combination;
 recording the length of communication between individuals using said communication channel for each said possible combination;
 ranking combination matches based on said number of said express desires to communicate or said length of communication;
 weighting said combinations, which have a higher said ranking, higher in said future searches.

13. A device configured to open a communications channel between two individuals based on criteria about the individuals, comprising:
 an input and output user interface;
 memory;
 a storage device;
 a network node receiving a date of birth for each individual of said two individuals and sending each individual, of said two individuals questions as well as receiving answers to said questions from each said individual;
 a processor, configured to carry out instructions to determine a MBTI for each said individual based on said answers, determine each said individual's Chinese zodiac, based on said received date of birth, and determine a western zodiac for each said individual, based on said received date of birth;
 whereby said network node further receives attributes characteristic of each said individual, and required attributes of another individual;
 said processor carries out instructions to determine compatibility according to said determined MBTI for each said individual, and compatibility according to said Chinese zodiac and said western zodiac; and
 said device receives an indication by one said individual of accepting a match, and opens a communication channel between said one individual and said another individual associated with said match.

14. The device of claim 13, wherein a characteristic attribute of said individuals is the distance from said individual.

15. The device of claim 13, wherein said characteristic attributes further comprise an interest, by each said individual, in a particular relationship type, wherein said relationship type is a romantic partnership or a friendship.

16. The device of claim 13, wherein said characteristic attributes further comprise an interest, by each said individual, in a particular relationship type, wherein said relationship type is a business relationship.

17. The device of claim 13, wherein a match for individuals is suggested based on a weighted average of compatibility of Chinese zodiac and western astrology.

18. The device of claim 13, wherein MBTI is weighted against Chinese zodiac and western astrology and highest compatibility rating of said two combinations is suggested as a match to said individuals.

19. The device of claim 13, wherein when a weighted average of compatibility between a western zodiac and Chinese zodiac is low compared to a predefined threshold or absent, then a match is suggested based on western zodiac.

20. The device of claim 13, wherein individuals are of the same type of MBTI and a weighted average of compatibility between a western astrology and Chinese zodiac is low compared to a predefined threshold, then a match is suggested based on said MBTI compatibility rating.

* * * * *